US008577001B2

(12) United States Patent
Orr et al.

(10) Patent No.: US 8,577,001 B2
(45) Date of Patent: Nov. 5, 2013

(54) METHODS AND SYSTEMS FOR CONTROLLING THE BLOCKING OF TELEPHONE CALLS

(75) Inventors: Charles David Orr, Burlington, NC (US); Timothy Edwin Pabon, Greensboro, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 0 days.

(21) Appl. No.: 13/184,861

(22) Filed: Jul. 18, 2011

(65) Prior Publication Data

US 2012/0014517 A1 Jan. 19, 2012

Related U.S. Application Data

(60) Provisional application No. 61/365,017, filed on Jul. 16, 2010.

(51) Int. Cl.
*H04M 1/56* (2006.01)
*H04M 15/06* (2006.01)
*H04M 3/00* (2006.01)

(52) U.S. Cl.
USPC ..................................... 379/142.05; 379/188

(58) Field of Classification Search
USPC .......... 379/142.05, 188, 196, 201.02, 207.13, 379/142.01, 144.02
See application file for complete search history.

(56) References Cited

U.S. PATENT DOCUMENTS

| | | | | |
|---|---|---|---|---|
| 6,654,452 | B1 * | 11/2003 | Murray et al. | 379/197 |
| 2002/0168055 | A1 * | 11/2002 | Crockett et al. | 379/88.01 |
| 2004/0213396 | A1 * | 10/2004 | MacNamara et al. | 379/210.02 |
| 2004/0218743 | A1 * | 11/2004 | Hussain et al. | 379/201.11 |

* cited by examiner

*Primary Examiner* — Quoc D Tran
(74) *Attorney, Agent, or Firm* — Kilpatrick Townsend & Stockton LLP

(57) ABSTRACT

Computer-implemented systems and methods for controlling the blocking of telephone calls are disclosed. A person, for example, bothered by calls from a prison inmate may desire to block future call attempts from that inmate or even desire to block all calls from the confinement/correctional institution at which the inmate is housed. To reduce accidental and fraudulent call blocking, various techniques are used to verify that the party requesting the block is, in fact, the party in control of the telephone number requested to be blocked. Embodiments herein enable call blocking using systems that require little or no human interaction to process a block request, reduce or eliminate accidental blocks via a callback confirmation process, create a documentation trail via the use of a profile and PIN system used for the processing of a block, and/or reduce fraudulent blocks by parties other than those authorized to do so via CNAM (Caller ID) verification.

37 Claims, 7 Drawing Sheets

METHODS AND SYSTEMS FOR CONTROLLING THE BLOCKING OF TELEPHONE CALLS

RELATED APPLICATION

This document claims the benefit of U.S. Provisional Application Ser. No. 61/365,017, entitled "Methods and Systems For Blocking Telephone Calls" and filed Jul. 16, 2010, the entire contents of which are incorporated by this reference.

FIELD

This disclosure relates generally to controlling the blocking of telephone calls and more particularly is related to methods and systems for controlling the blocking of telephone calls directed to a particular telephone number or called party from an inmate or other particular person or from a correctional facility, facilities, or other particular source or sources.

BACKGROUND

Frequently within the context of providing inmate telephone services, parties who are not confined request that their numbers be blocked from future call attempts from those who are confined. While it is always an option for the called party to simply not answer, not accept the call upon answering, or to immediately hang up, for many reasons it is more desirable to most parties that the call never be allowed to perpetuate in the first place and to inform the inmate that calls are not permitted to this number. There are a number of reasons why these unwanted calls may initially occur. For example, inmates often call random numbers in an attempt to talk to anyone who will accept the call, oftentimes then encouraging the called party to connect them to yet another party via 3-way or conference calling features. Other times, the inmates are deliberately attempting to harass, annoy or intimidate the called party. Still other times, a called party may wish to block the (typically collect) calls due to budgetary constraints that are not being respected by the calling inmate. Many other valid reasons are commonly given for wishing to have the call attempts blocked, and it is typically a requirement of the provider of the telephone service to provide a means for accomplishing these blocks in as simple and automated fashion as possible.

Historically, inmate phone service providers have accomplished the processing of these blocks in a variety of ways. One common method is that the called party may submit a request to the confinement facility, who will then relay the request to the phone service provider, who will then process or "load" the block into the telephone system, preventing future call attempts. Another common method is that the called party may call the telephone service provider directly and speak with a customer service representative, requesting that the number be blocked. Both of these methods are labor-intensive, as they require the involvement of multiple persons, and also provide no security against one person attempting to block another person's phone number, such as commonly occurs in the case of a suspicious spouse or a jilted ex-spouse, for example. Yet another common method of processing these block requests is that upon receiving the call from the inmate, the called party is instructed to simply press a specified DTMF digit to indicate that they wish to have their number blocked. This method, while improving on the efficiency of the process, also leaves open some potential flaws for exploitation and is highly prone to unintentional blocks which must then be reversed upon eventually discovering that they occurred. For example, it is quite common for parties to use social engineering and deception to convince a customer service rep to temporarily activate call-forwarding from one person's phone to another. In this context, a party could have an intended called party's phone number forwarded to their own, and then, upon receipt of an inmate phone call, block the number such that it appears to the inmate that the calls are unwanted, and it appears to the intended called party that no calls have been attempted. Another weakness of this method is the ease by which a called party may unintentionally block their own number by way of an errant key press, and further, that there is no simple recourse or confirmation once this has been done other than to call the confinement facility or the phone service provider's customer service and find out that the number is indeed blocked, and then try to convince them that it was an accident, while having no audit trail available for verification. Yet another weakness of this method is that in the case where there are multiple persons who potentially may answer the called number, there is no means provided for documenting who performed the blocking action, or who the authorized party is, should a dispute arise between the parties regarding who has the authority to perform such actions, or to unblock the number, as is frequently observed in cases involving parents and children.

SUMMARY

One exemplary embodiment involves receiving, during a communication session, a request to block calls to a telephone number to be blocked, providing a confirmation code during the communication session, initiating a confirmation call to the telephone number to be blocked; and establishing a block based on a determination that the confirmation code is received during the confirmation call, wherein the block blocks calls to the telephone number to be blocked.

Another exemplary embodiment involves receiving a request call made to a response system telephone number associated with blocking calls, providing a confirmation code during the request call, initiating a confirmation call from the telephone response system to a telephone number to be blocked, and establishing a block based on a determination that the confirmation code is received during the confirmation call, wherein the block blocks calls to the telephone number to be blocked.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Computer-implemented systems and methods for blocking telephone calls are disclosed. A person, for example, bothered by calls from a prison inmate may desire to block future call attempts from that inmate or even desire to block all calls from the confinement/correctional institution at which the inmate is housed. To reduce accidental and fraudulent call blocking, various techniques are used to verify that the party requesting the block is, in fact, the party in control of the telephone number requested to be blocked. Embodiments herein enable call blocking using systems that require little or no human interaction to process a block request, reduce or eliminate accidental blocks via a callback confirmation process, create a documentation trail via the use of a profile and PIN system used for the processing of a block, and/or reduce fraudulent blocks by parties other than those authorized to do so via CNAM (Caller ID) verification. These illustrative examples are given to introduce the reader to the general subject matter discussed here and are not intended to limit the scope of the disclosed concepts. The following discussion describes various additional embodiments and examples with reference to the drawings in which like numerals indicate like elements.

Figure 1:
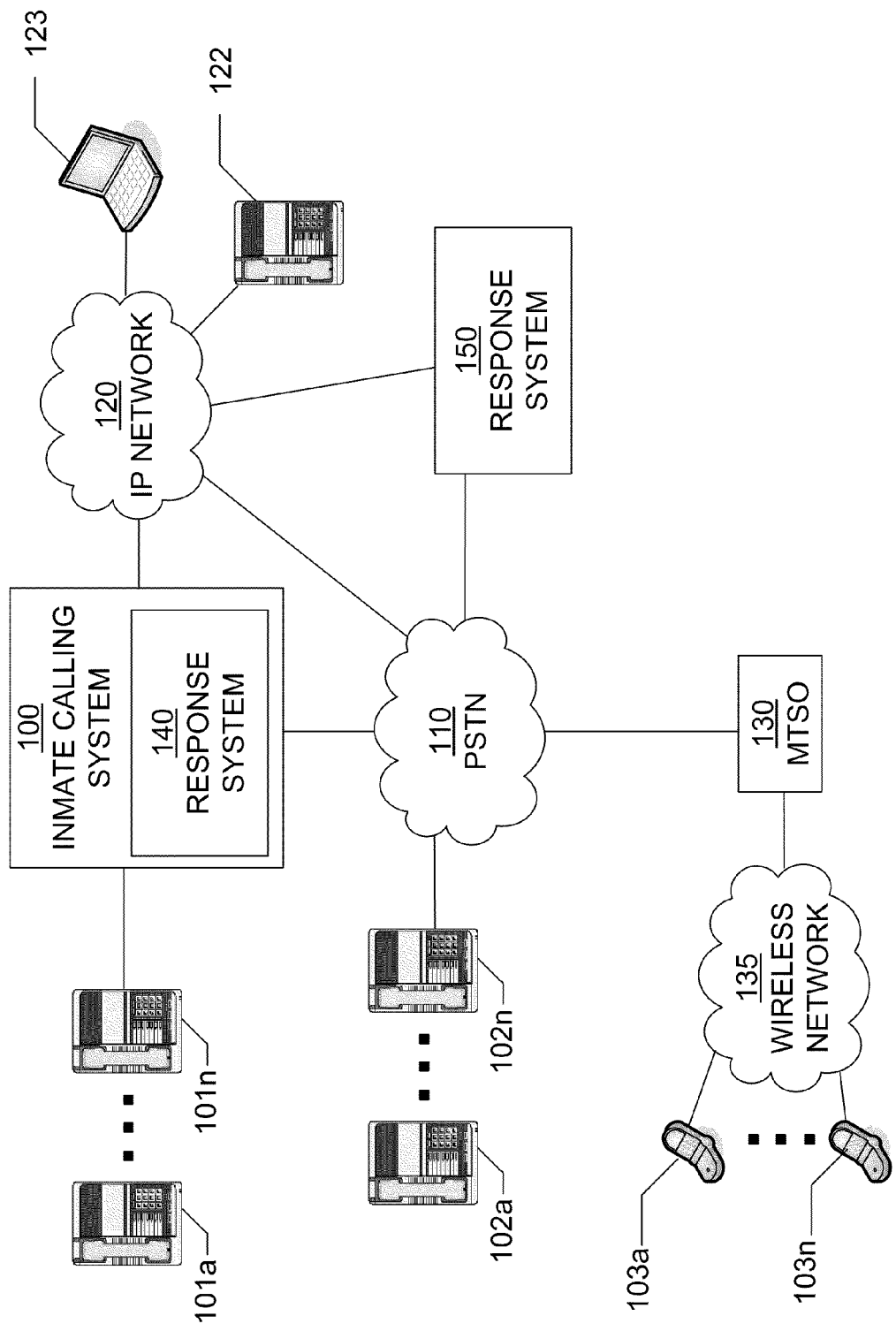
FIG. 1 is a block diagram depicting an exemplary communications environment for implementing certain embodiments.

FIG. 1 is a block diagram depicting an exemplary communications environment for implementing certain embodiments. As shown in FIG. 1, a plurality of telephones 101a-n are shown connected to an Inmate Calling System (ICS) 100. The telephones 101a-n are illustratively within and under the control of a correctional institution and its officials. ICS system 100 is designed and configured to place telephone calls to authorized telephone stations 102a-n over the Public Switched Telephone Network (PSTN) 110. Mobile telephone stations 103a-n are telephone stations connected to ICS system 100 through PSTN 110 and mobile telephone control and interconnection facilities represented by Mobile Telephone Switching Office (MTSO) 130. ICS System 100 is also connected to an IP network 120, which may be a public or private network or combination of networks employing the Internet Protocol or other packet communication protocol. IP network 120, in turn, is connected to a representative computer 123 and IP telephone 122.

While ICS system 100 will illustratively be described in terms of connecting illustrative analog telephone stations 101a-n to PSTN 110 for connection to analog telephone stations such as 102a-n, it will be understood that embodiments disclosed herein can be applied in networks involving mobile telephone stations and networks, as well as IP telephones and other IP devices and networks. For example, IP telephone 122 may include a packet coder-decoder (codec) arranged for coding and transmitting packets to IP network 120, as well as receiving and decoding IP packets from IP network 120. Network 120, in turn, may include gateway facilities (to the extent not provided by ICS system 100) to allow analog stations 101a-n to communicate packets to IP phone 122 via ICS system 100.

Links 145 in FIG. 1 represent alternative call completion paths between calling stations 101a-n and authorized analog called stations such as 102a-n. Thus, in addition to routing and completing analog calls directly from ICS system 100 through PSTN 110 to a station 102a-n, it will prove advantageous in some cases to implement voice coding and packetizing in ICS 100 for routing through IP network 120 before linking the call via links 145 to PSTN 110 for completion to a station 102a-n, for example, by employing voice-over-IP (VoIP) techniques. A gateway may be used for interfacing links 145 between IP network 120 and PSTN 110. Voice signals from stations 102a-n may be converted into packets in like manner for transmission through gateway facilities and IP network 120 to ICS 100 for depacketing and decoding before delivery to a station 101a-n. In like manner, dual-tone multi-frequency (DTMF) signals generated at the stations 102a-n may also be coded and packetized at gateway facilities before being routed by IP network 120 for analyses, for example, by response system 140 at the ICS 100 or by response system 150 located external to the ICS 100.

Embodiments disclosed herein may provide call blocking functionality using one or both of response system 140 and response system 150. Response system 140 and response system 150 may collectively or individually include various components to receive and store instructions from users to implement call blocking. Such components may, as example, comprise telephone functionality and/or computer-executed instructions stored on software or hardware devices to receive telephone calls, initiate telephone calls, store and deliver audible announcements, receive, process, and store audio commands, and receive, process, and store DTMF commands. In various computer-implemented embodiments, applications may be resident in any suitable computer-readable medium and execute on any suitable processor. For example, a computer device may comprise a computer-readable medium such as a random access memory (RAM) coupled to a processor that executes computer-executable program instructions and/or accesses information stored in memory. Such a processor may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

Figure 2:
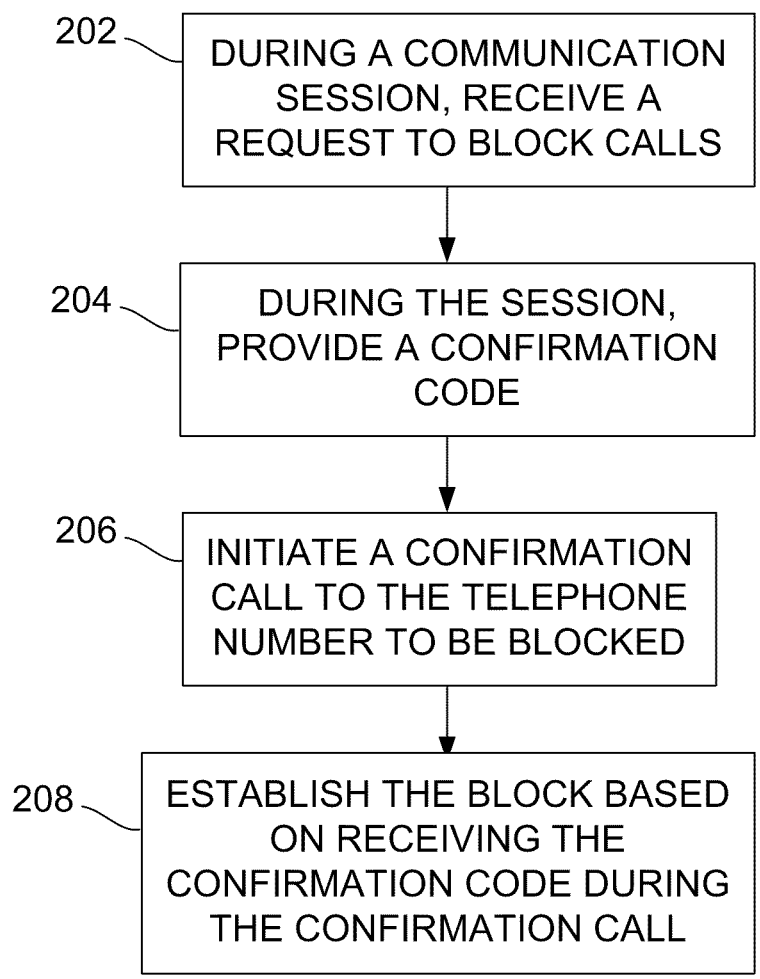
FIG. 2 is a flow chart illustrating an exemplary method of establishing a block.

FIG. 2 is a flow chart illustrating an exemplary method of establishing a block. Such an exemplary method may be performed via a variety of computer devices including for example, but not limited to, one or both of response system 140 at the ICS 100 and response system 150 located external to the ICS 100 of FIG. 1.

The exemplary method of FIG. 2 comprises during a communication session, receiving a request to block calls, as shown in element 202. For example, the request may request to block calls to a telephone number to be blocked. The communication session may comprise a telephone call from a party desiring to block calls to the telephone number to be blocked, one or more messages through a short message service (SMS), one or more electronic mail (E-mail) messages, or information provided through a webpage or rich Internet application, as examples.

The exemplary method of FIG. 2 further comprises providing a confirmation code during the communication session, as shown in element 204. Prior to providing the confirmation during the communication session, the telephone number to be blocked is identified. For example, identifying the telephone number to be blocked may involve providing a message requesting entering of the telephone number to be blocked and receiving the telephone number to be blocked in response to the message.

In addition, a called party profile may be associated with the communication session. Receiving information sufficient to associate the communication session with a called party profile may involve, for example, during the communication session, providing a message requesting entering of a personal identification number (PIN) and receiving the PIN in response to the message. Alternatively, receiving information sufficient to associate the communication session with a called party profile may involve, for example, during the communication session, creating a new profile using information provided by the called party or otherwise determined and/or verified.

The exemplary method of FIG. 2 further comprises initiating a confirmation call to the telephone number to be blocked, as shown in element 206, and establishing a block based on a determination that the confirmation code is received during the confirmation call, as shown in element 208. The block blocks calls to the telephone number to be blocked. The confirmation call may involve providing a message indicating that a request has been made to block the telephone number to be blocked from receiving certain calls and requesting entry of the confirmation code to complete the block. The confirmation code may be received in response to such a message.

Figure 3:
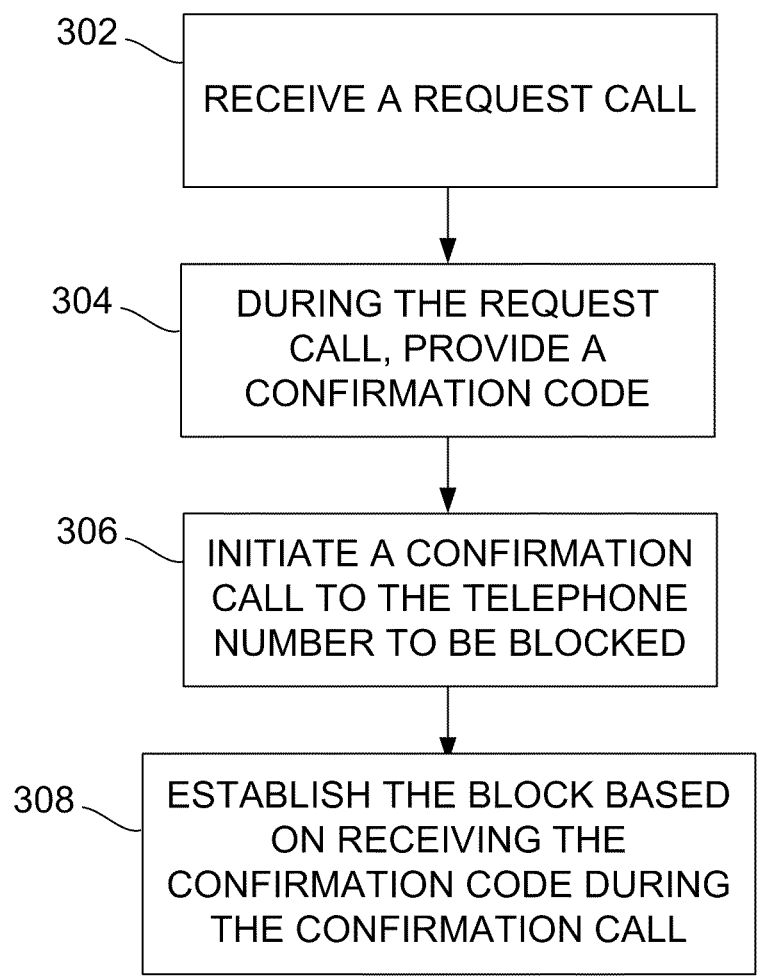
FIG. 3 is a flow chart illustrating another exemplary method of establishing a block.

FIG. 3 is a flow chart illustrating another exemplary method of establishing a block. Such an exemplary method may be performed via a variety of computer devices including for example, but not limited to, one or both of response system 140 at the ICS 100 and response system 150 located external to the ICS 100 of FIG. 1. Such a response system may be a telephone response system configured to receive and/or initiate telephone calls, and/or to provide audible messages and receive audible or other responses during such calls.

The exemplary method of FIG. 3 comprises receiving a request call, as shown in element 302. Such a request call may be a call made by a person who is being harassed by unwanted calls from an inmate at a correctional facility. The request call may be made to a response system telephone number associated with blocking calls and received and processed by the response system. Such a response system telephone number associated with blocking calls may be provided, as examples, to recipients of calls from particular inmates or other persons and/or to recipients of calls from persons at a particular confinement or other facility.

The response system may confirm that an intention of the request call is to block calls by, for example, providing an audible message requesting entering of a particular telephone digit or combination of digits to block calls and receiving the digit or combination of digits in response to the audible message.

The response system may identify the telephone number to be blocked by, for example, providing an audible message requesting entering of the telephone number to be blocked and receiving the telephone number to be blocked in response to the audible message. The response system may confirm that a telephone number of a caller of the request call is the same as the telephone number to be blocked. Such confirmation may involve, for example, receiving an identification of the telephone number of the caller from a caller identification (Caller ID) service separate from the caller, receiving the telephone number to be blocked in response to an audible message in response to requesting entering of the telephone number to be blocked, and comparing the number of the caller with the telephone number to be blocked.

The response system may identify a profile of a person present on the request call, for example, to guard against fraud and mistake. This may involve, during the request call, receiving information from a person present on the request call sufficient to associate the person present on the request call with a profile. For example, the response system may provide an audible message requesting entering of a personal identification number (PIN) and receive the PIN in response to the audible message. Alternatively, receiving information sufficient to associate the person present on the request call with a profile may involve creating of new profile to be associated with a personal identification number (PIN).

The exemplary method of FIG. 3 further comprises providing a confirmation code during the request call, as shown in element 304. Providing the confirmation code may further comprise providing information identifying when the confirmation code will be required. For example, it may involve providing an audible message indicating that to complete blocking the telephone response system will call and prompt for entry of the confirmation code.

The exemplary method of FIG. 3 further comprises initiating a confirmation call to a telephone number to be blocked, as shown in element 306. The response system may initiate such a confirmation call. The request call may be terminated prior to initiating the confirmation call. During the confirmation call, an audible message may be provided indicating that a request has been made to block the telephone number to be blocked from receiving certain calls and requesting entry of the confirmation code to complete the block. The confirmation code may be received in response to such a message.

The exemplary method of FIG. 3 further comprises establishing a block based on receiving the confirmation code during the confirmation call, as shown in element 308. The block blocks calls to the telephone number to be blocked. The scope of the block may define whether to block calls to the telephone number to be blocked from various sources, e.g., from a particular inmate or confinement facility. The scope of the block may be determined during the confirmation call, for example, by providing an audible message requesting identification of the scope of the block and receiving the identification of the scope of the block in response to such a message. As additional examples, the scope of the block may block only calls from an inmate that called the telephone number to be blocked most recently, block only calls from a facility of an inmate that called the telephone number to be blocked most recently, or calls from any confinement facility.

Figure 4:
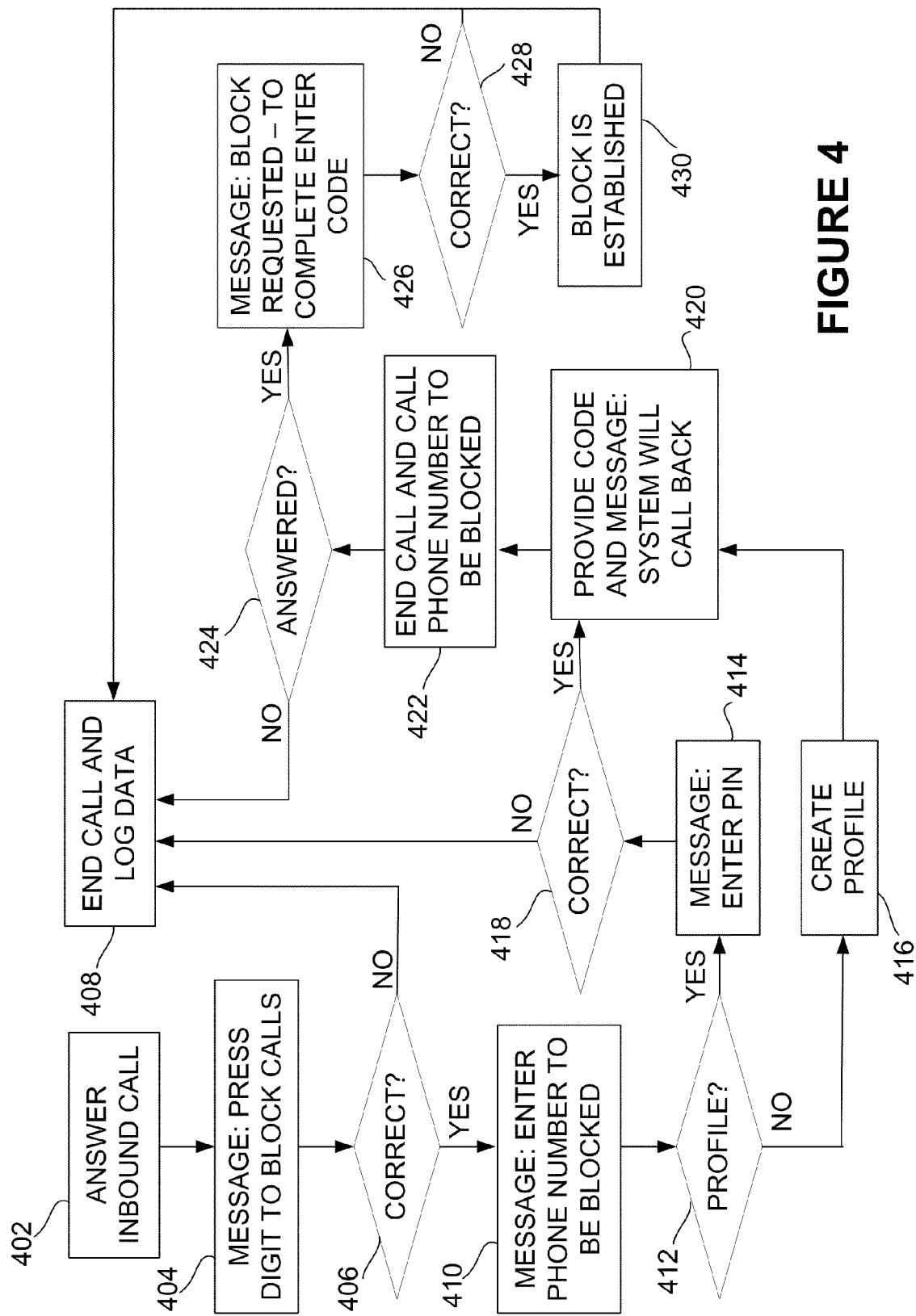
FIG. 4 is a flow chart illustrating another exemplary method of establishing a block.

FIG. 4 is a flow chart illustrating another exemplary method of establishing a block. Such an exemplary method may be performed via a variety of computer devices including for example, but not limited to, one or both of response system 140 at the ICS 100 and response system 150 located external to the ICS 100 of FIG. 1. FIG. 4 may result after an unwanted call from a prison inmate. Upon receipt of such an inmate call, a party may be advised to call a toll-free or other number if he/she wishes to prevent future attempts to call his/her telephone number. In certain embodiments, the number is answered and processed by a specially-designed automated interactive voice response (IVR) system that will acquire the number requested to be blocked and assign a confirmation code to be entered by the party upon an immediate return callback to verify the correctness of the number and to confirm the intention to block. Because the callback is placed only to the number which was requested to be blocked, parties are not able to block someone else's number, and because of the callback confirmation, the possibility of accidental blocks is reduced if not eliminated. Due to the profile and PIN system that is used, a documentation and audit trail is created for future use when determining who is authorized to make changes to the status of the number or account.

In FIG. 4, a response system such as an IVR answers an inbound call, as shown in element 402, and provides an audible message for the caller to press a particular digit to block calls, as shown in element 404. If the correct digit is not received as determined by element 406, the call is ended and data is logged in element 408. If the correct digit is received, a message is provided requesting that the caller enter the phone number to be blocked, as shown in element 410. The number to be blocked may be entered by the caller saying the number or pressing the numerical digits on the caller's phone corresponding to the phone number to be blocked.

The exemplary method of FIG. 4 determines whether a caller already exists for the phone number as shown in element 412. If not, a profile can be created in element 416 using, for example, caller-provided information. If a profile already exists, a message is provided requesting the caller enter the associated PIN, as shown in element 414. If a correct PIN is not entered as determined in block 418, the call ends and data is logged in element 408.

If a new profile is created or a correct PIN is entered for an existing profile, the exemplary method provides a confirmation code and a message instructing the caller that the system will call him or her back and prompt for the confirmation code to be entered, as shown in element 420. The confirmation code may be randomly generated or created using any other suitable technique that ensures against fraud and mistake.

After providing the confirmation code, the call is ended and the response system calls back the number to be blocked, as shown in element 422. If the call is not answered as determined by element 424, the method proceeds to end the call and log data, as shown in element 408. If answered, a message is provided indicating that a block has been requested and instructing the recipient to enter the confirmation code to complete the block, as shown in element 426. If the correct code is not entered as determined at element 428, the method proceeds to end the call and log data, as shown in element 408. If the correct code is entered, the method proceeds to establish the block, as shown in element 430, and end the call and log data, as shown in element 408.

Figure 5:
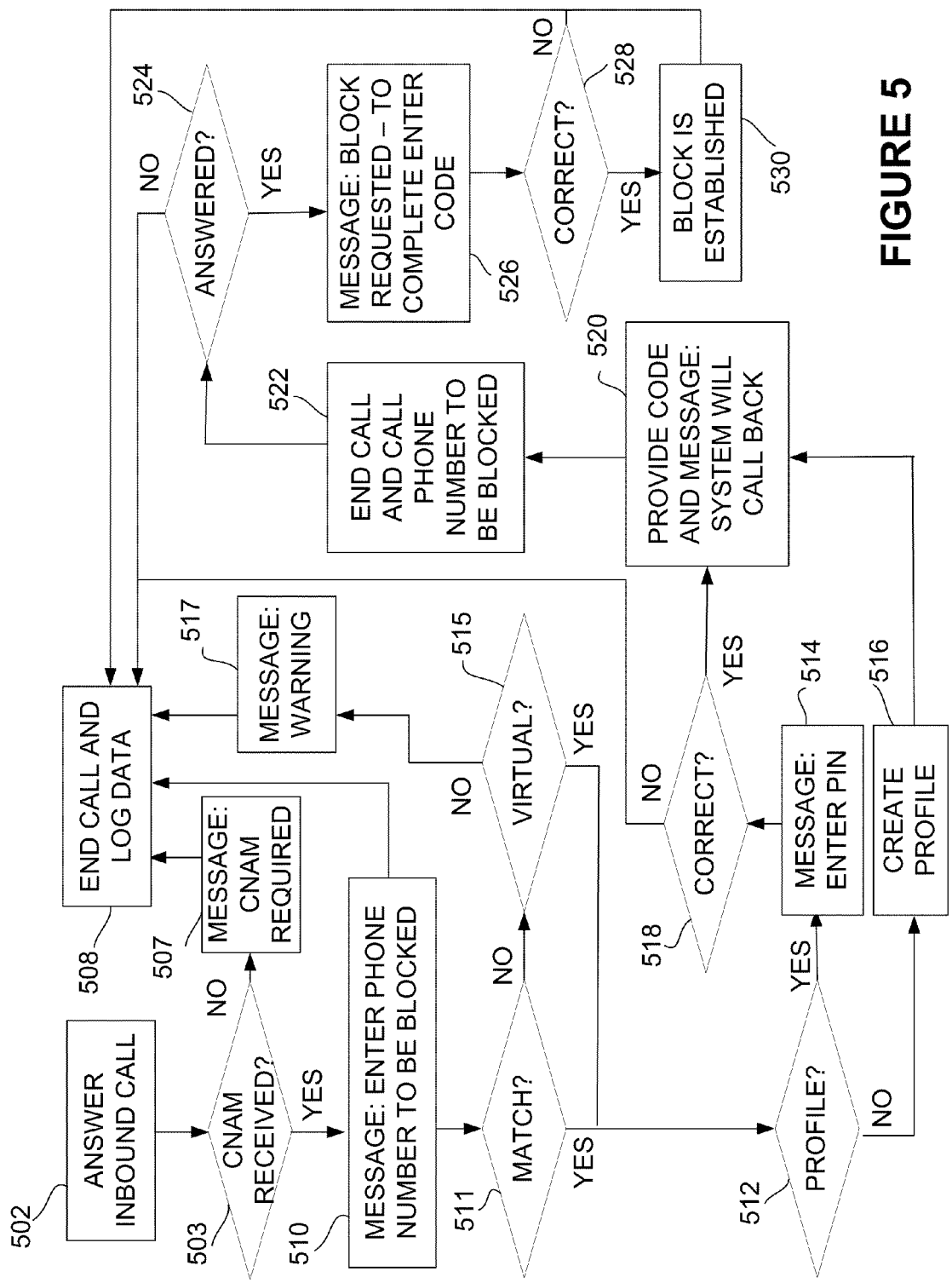
FIG. 5 is a flow chart illustrating a variation of the exemplary method of establishing a block shown in FIG. 4.

FIG. 5 is a flow chart illustrating a variation of the exemplary method of establishing a block shown in FIG. 4. This example requires that the caller must request the block while calling from the number to be blocked, except in the case of "virtual" numbers which cannot originate calls. In FIG. 5, a response system such as an IVR answers an inbound call, as shown in element 502. In element 503, the method determines whether CNAM (caller ID) information is received. If not, as shown in element 507, a message is provided that a CNAM is required to use the system and may provide information on how to enable it, and the call is ended and data is logged in element 508. If CNAM information is received, a message is provided requesting that the caller enter the phone number to be blocked, as shown in element 510. The number to be blocked may be entered by the caller saying the number or pressing the numerical digits on the caller's phone corresponding to the phone number to be blocked.

The exemplary method of FIG. 5 determines whether the entered telephone number to be blocked matches the CNAM information, as shown in element 511. If not, the method proceeds to determine if the phone number to be blocked is a virtual number as shown in element 515, for example, by comparing the number with LIDB, NPA/NXX, Account Owner, etc. If the number is not a virtual number, a warning message is provided as shown in element 517 and the call is ended and data is logged in element 508. An exemplary warning message instructs the caller that the requests to block must originate from the number to be blocked. If the entered telephone number to be blocked matches the CNAM information number or if the number to be blocked is a virtual number, the method the proceeds to element 512.

The exemplary method of FIG. 5 determines whether a caller already exists for the phone number as shown in element 512. If not, a profile can be created in element 516 using, for example, caller-provided information. If a profile already exists, a message is provided requesting the caller enter the associated PIN, as shown in element 514. If a correct PIN is not entered as determined in element 518, the call ends and data is logged in element 508.

If a new profile is created or a correct PIN is entered for an existing profile, the exemplary method provides a confirmation code and a message instructing the caller that the system will call him or her back and prompt for the confirmation code to be entered, as shown in element 520. The confirmation code may be randomly generated or created using any other suitable technique that ensures against fraud and mistake.

After providing the confirmation code, the call is ended and the response system calls back the number to be blocked, as shown in element 522. If the call is not answered as determined by element 524, the method proceeds to end the call and log data, as shown in element 508. If answered, a message is provided indicating that a block has been requested and instructing the recipient to enter the confirmation code to complete the block, as shown in element 526. If the correct code is not entered as determined at element 528, the method proceeds to end the call and log data, as shown in element 508. If the correct code is entered, the method proceeds to establish the block, as shown in element 530, and end the call and log data, as shown in element 508.

Figure 6:
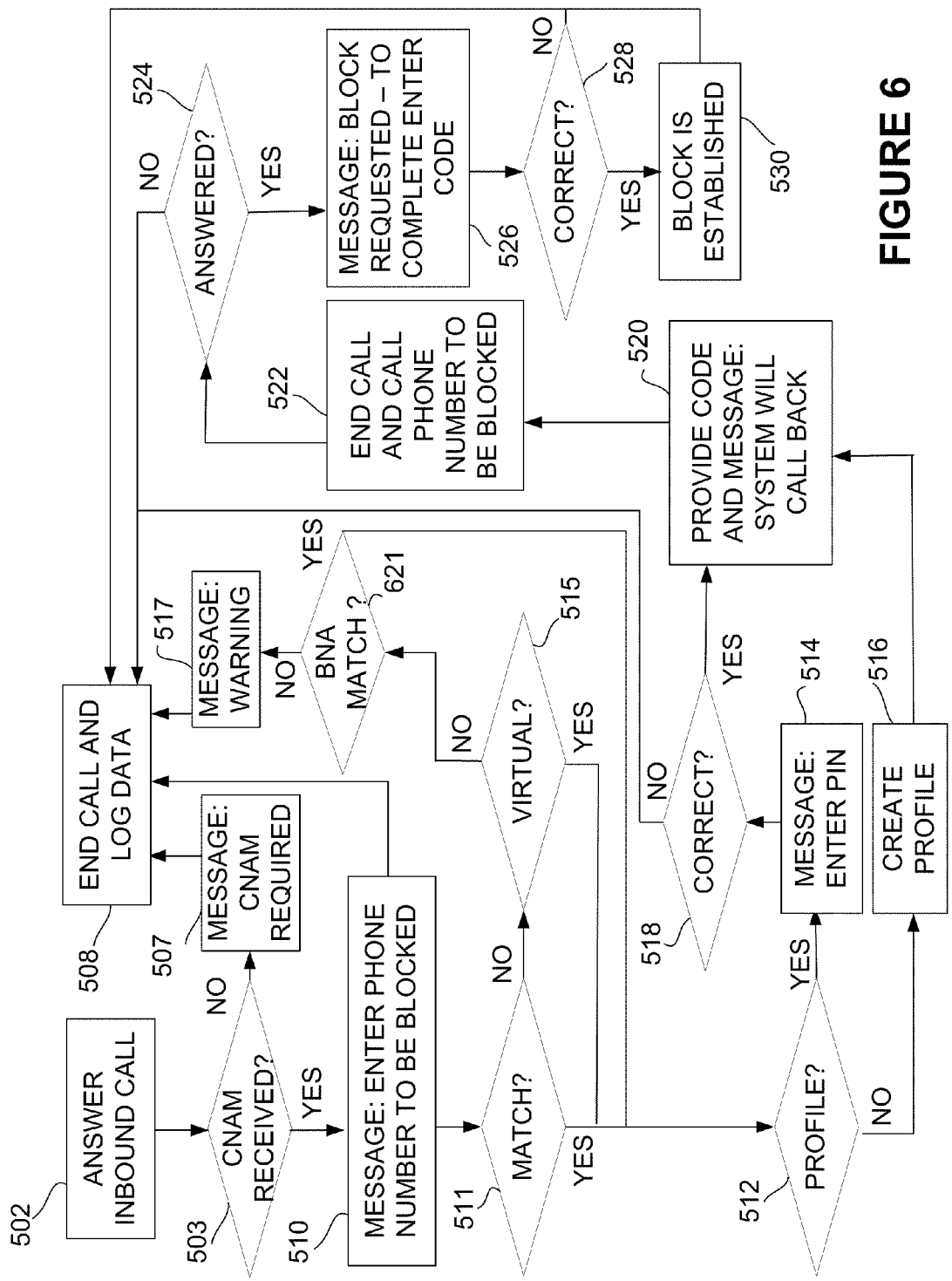
FIG. 6 is a flow chart illustrating a variation of the exemplary method of establishing a block shown in FIG. 5.

FIG. 6 is a flow chart illustrating a variation of the exemplary method of establishing a block shown in FIG. 5. FIG. 6 illustrates an advancement to FIG. 3 in that an allowance is made if the BNA (Billing Name and Address) is found to match for both the calling number and the number to be blocked. Application for this can be found in office PBX systems, for example, where an outbound call rarely originates on the same number that inbound calls are received, but for which the BNA will match on both numbers. In FIG. 6, upon determining that the phone number to be blocked is not a virtual number as shown in element 515, the method proceeds to determine whether there is a BNA match, as illustrated in element 621. If there is no BNA match, the method proceeds to provide the warning message as shown in element 517. However, if there is a BNA match the method proceeds to element 512.

Figure 7:
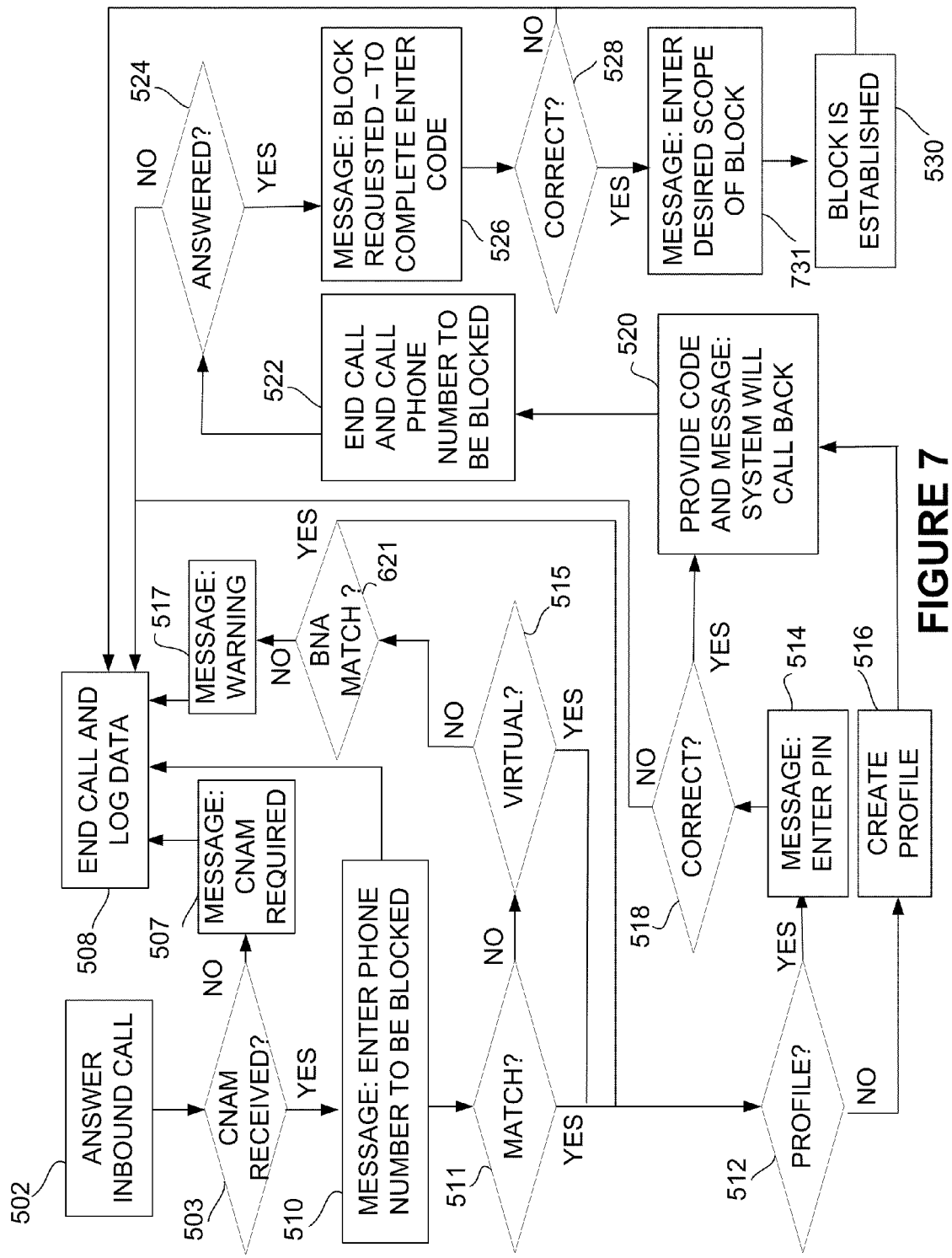
FIG. 7 is a flow chart illustrating a variation of the exemplary method of establishing a block shown in FIG. 6.

FIG. 7 is a flow chart illustrating a variation of the exemplary method of establishing a block shown in FIG. 6. FIG. 6 illustrates offering the caller a choice regarding the scope of the block, e.g., whether to block the number of only the most recent inmate who attempted to call, numbers of only the facility from which a most recent call originated, or any numbers associated with the a provider, e.g., a confinement telephone service provider that services multiple facilities. Application for this feature can be found, for example, in a customer who may not want future calls from a particular inmate, but would like to receive calls in the event that another person were to be incarcerated in the same facility. In FIG. 7, after determining that a correct confirmation code is received in element 528, the method provides a message for the caller to enter a desired scope of the block, as shown in element 731. A response system may, for example, provide a list of options from which the caller may choose by entering a corresponding digit or voice command during the confirmation call.

After the scope of the block is determined, the method proceeds to establish the block as shown in element 530.

The techniques exemplified in the above systems and methods can be used for both the blocking and the unblocking of customer numbers, i.e., requests to unblock a number can be processed in a similar manner as requests to block a number. Additionally, confirmation of blocking or unblocking a number, however achieved, can be supplemented with notification to the account owner that the block/unblock status has been changed whenever a request has been successfully completed. This can be accomplished, for example, by accessing an account owner's profile information and sending notification via an indicated preferred method of contact, which may be SMS, email, telephone, or any other form of communication.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within system memory, such as a computer memory. These algorithmic descriptions or representations are examples of techniques used by those of ordinary skill to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of an electronic device, such as one or more response systems comprising computers or other electronic devices, that manipulate or transform data represented as physical electronic or magnetic quantities within memories, registers, or other information storage devices, transmission devices, or display devices.

The system or systems discussed herein are not limited to any particular hardware architecture or configuration. A device can include any suitable arrangement of components that provide a result conditioned on one or more inputs. Suitable devices include multipurpose microprocessor-based computer systems accessing stored software that programs or configures the system from a general purpose apparatus to a specialized apparatus implementing one or more embodiments of the present subject matter. Any suitable programming, scripting, or other type of language or combinations of languages may be used to implement the teachings contained herein in software to be used in programming or configuring a device. Embodiments of the methods disclosed herein may be performed in the operation of such devices. The order of the elements presented in the examples above can be varied—for example, elements can be re-ordered, combined, and/or broken into sub-elements. Certain elements or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
receiving, during a communication session, a request to block calls to a call recipient telephone number to be blocked such that the call recipient telephone number to be blocked will not receive calls from a caller;
providing a confirmation code during the communication session;
initiating a confirmation call to the call recipient telephone number to be blocked, wherein the confirmation call is separate from the communication session; and
establishing a block based on a determination that the confirmation code is received during the confirmation call, wherein the block blocks calls from the caller to the call recipient telephone number to be blocked.

2. The method of claim 1 wherein the communication session is a telephone call from a party desiring to block calls to the telephone number to be blocked.

3. The method of claim 1 wherein the communication session comprises one or more messages through a short message service (SMS).

4. The method of claim 1 wherein the communication session comprises one or more electronic mail (E-mail) messages.

5. The method of claim 1 further comprising, during the communication session, identifying the telephone number to be blocked by:
providing a message requesting entering of the telephone number to be blocked; and
receiving the telephone number to be blocked in response to the message.

6. The method of claim 1 further comprising, during the communication session, receiving information sufficient to associate the communication session with a called party profile.

7. The method of claim 6 wherein receiving the information sufficient to associate the communication session with the called party profile comprises:
providing a message requesting entering of a personal identification number (PIN); and
receiving the PIN in response to the message.

8. The method of claim 6 wherein receiving the information sufficient to associate the communication session with the called party profile comprises creating a new profile.

9. The method of claim 1 further comprising, during the confirmation call, providing a message indicating that a request has been made to block the telephone number to be blocked from receiving certain calls and requesting entry of the confirmation code to complete the block.

10. The method of claim 9 further comprising, during the confirmation call, receiving the confirmation code in response to the message.

11. A method provided via a telephone response system, the method comprising:
- receiving a request call made to a response system telephone number associated with blocking calls;
- providing a confirmation code during the request call;
- initiating a confirmation call from the telephone response system to a telephone number to be blocked, wherein the confirmation call is separate from the request call; and
- establishing a block based on a determination that the confirmation code is received during the confirmation call, wherein the block blocks calls to the telephone number to be blocked.

12. The method of claim 11 further comprising, during the request call, confirming that an intention of the request call is to block calls by:
- providing an audible message requesting entering of a particular telephone digit or combination of digits to block calls; and
- receiving the digit or combination of digits in response to the audible message.

13. The method of claim 11 further comprising, during the request call, identifying the telephone number to be blocked by:
- providing an audible message requesting entering of the telephone number to be blocked; and
- receiving the telephone number to be blocked in response to the audible message.

14. The method of claim 11 further comprising, during the request call, confirming that a telephone number of a caller of the request call is the same as the telephone number to be blocked.

15. The method of claim 14 wherein confirming that the telephone number of the caller of the request call is the same as the telephone number to be blocked comprises:
- receiving an identification of the telephone number of the caller from a caller identification (Caller ID) service separate from the caller;
- receiving the telephone number to be blocked in response to an audible message in response to requesting entering of the telephone number to be blocked; and
- comparing the number of the caller with the telephone number to be blocked.

16. The method of claim 11 further comprising, during the request call, receiving information from a person present on the request call sufficient to associate the person present on the request call with a profile.

17. The method of claim 16 wherein receiving the information sufficient to associate the person present on the request call with a profile comprises:
- providing an audible message requesting entering of a personal identification number (PIN); and
- receiving the PIN in response to the audible message.

18. The method of claim 16 wherein receiving the information sufficient to associate the person present on the request call with a profile comprises creating a new profile to be associated with a personal identification number (PIN).

19. The method of claim 11 wherein providing the confirmation code comprises providing an audible message indicating that to complete blocking the telephone response system will call and prompt for entry of the confirmation code.

20. The method of claim 11 further comprising terminating the request call prior to initiating the confirmation call.

21. The method of claim 11 further comprising, during the confirmation call, providing an audible message indicating that a request has been made to block the telephone number to be blocked from receiving certain calls and requesting entry of the confirmation code to complete the block.

22. The method of claim 11 further comprising, during the confirmation call, receiving the confirmation code in response to the audible message.

23. The method of claim 11 wherein the response system telephone number associated with blocking calls is provided to recipients of calls from particular persons or from persons at a particular facility.

24. The method of claim 11 wherein the response system telephone number associated with blocking calls is provided to recipients of calls from inmates at a particular confinement facility.

25. The method of claim 11 wherein the block blocks calls from a particular inmate.

26. The method of claim 11 wherein the block blocks calls from a particular confinement facility.

27. The method of claim 11 further comprising determining a scope of the block during the confirmation call by:
- providing an audible message requesting identification of the scope of the block; and
- receiving the identification of the scope of the block in response to the audible message.

28. The method of claim 27 wherein the scope of the block is to block only calls from an inmate that called the telephone number to be blocked most recently.

29. The method of claim 27 wherein the scope of the block is to block only calls from a facility of an inmate that called the telephone number to be blocked most recently.

30. The method of claim 27 wherein the scope of the block is to block all calls from any confinement facility.

31. A system comprising:
- instructions stored on a non-transitory computer readable medium;
- a processor operable to execute the instructions that when executed by the processor cause the processor to:
  - receive, during a communication session, a request to block calls to a call recipient telephone number to be blocked such that the call recipient telephone number to be blocked will not receive calls from a caller;
  - provide a confirmation code during the communication session;
  - initiate a confirmation call to the call recipient telephone number to be blocked, wherein the confirmation call is separate from the communication session; and
  - establish a block based on a determination that the confirmation code is received during the confirmation call, wherein the block blocks calls to the telephone number to be blocked.

32. A non-transitory computer-readable medium on which is encoded instructions, the program code comprising:
- for receiving, during a communication session, a request to block calls to a call recipient telephone number to be blocked such that the call recipient telephone number to be blocked will not receive calls from a caller;
- for providing a confirmation code during the communication session;

for initiating a confirmation call to the call recipient telephone number to be blocked, wherein the confirmation call is separate from the communication session; and for establishing a block based on a determination that the confirmation code is received during the confirmation call, wherein the block blocks calls to the telephone number to be blocked.

33. A method comprising:

receiving, during a communication session, a request to unblock calls to a telephone number to be unblocked such that the call recipient telephone number to be unblocked will receive calls from a caller;

providing a confirmation code during the communication session;

initiating a confirmation call to the call recipient telephone number to be unblocked, wherein the confirmation call is separate from the communication session; and disabling a block based on a determination that the confirmation code is received during the confirmation call, wherein disabling the block allows calls to the telephone number to be unblocked.

34. The method of claim 1 wherein the confirmation call is subsequent to a conclusion of the communication session.

35. The method of claim 1 wherein the request requests blocking of calls made from an identified inmate in a confinement facility to the call recipient telephone number.

36. The method of claim 35 wherein calls from the identified inmate from the confinement facility come from a plurality of calling phone numbers.

37. The method of claim 1 wherein an inmate telephone system performs the receiving of the request, providing of the confirmation code, initiating of the confirmation call, and establishing of the block.

* * * * *